US011841772B2

(12) United States Patent
Azaria et al.

(10) Patent No.: US 11,841,772 B2
(45) Date of Patent: Dec. 12, 2023

(54) DATA-DRIVEN VIRTUAL MACHINE RECOVERY

(71) Applicant: Dell Products L.P., Round Rock, TX (US)

(72) Inventors: Nadav Azaria, Beer Sheva (IL); Avitan Gefen, Tel Aviv (IL)

(73) Assignee: DELL PRODUCTS L.P., Round Rock, TX (US)

( * ) Notice: Subject to any disclaimer, the term of this patent is extended or adjusted under 35 U.S.C. 154(b) by 544 days.

(21) Appl. No.: 17/164,085

(22) Filed: Feb. 1, 2021

(65) Prior Publication Data
US 2022/0245036 A1 Aug. 4, 2022

(51) Int. Cl.
*G06F 9/455* (2018.01)
*G06F 11/14* (2006.01)
*G06N 20/00* (2019.01)
*G06N 5/04* (2023.01)

(52) U.S. Cl.
CPC ...... *G06F 11/1469* (2013.01); *G06F 9/45558* (2013.01); *G06N 5/04* (2013.01); *G06N 20/00* (2019.01); *G06F 2009/45562* (2013.01); *G06F 2009/45575* (2013.01); *G06F 2009/45583* (2013.01); *G06F 2201/84* (2013.01)

(58) Field of Classification Search
CPC .................................................. G06F 9/45558
USPC ........................................................ 718/1
See application file for complete search history.

(56) References Cited

U.S. PATENT DOCUMENTS

| | | | | |
|---|---|---|---|---|
| 9,128,742 B1* | 9/2015 | Akolkar | .............. | G06F 9/45558 |
| 9,524,215 B1* | 12/2016 | Khandelwal | ........ | G06F 11/1469 |
| 9,672,060 B2* | 6/2017 | Behere | ................ | G06F 9/45558 |
| 9,965,357 B1* | 5/2018 | Earl | ...................... | G06F 11/203 |
| 10,152,387 B1* | 12/2018 | Chakraborty | ....... | G06F 11/1469 |
| 10,248,619 B1* | 4/2019 | Kumar | .................. | G06F 16/166 |
| 10,996,974 B2* | 5/2021 | Dornemann | ........ | G06F 11/2094 |
| 11,513,914 B2* | 11/2022 | Gupta | ................. | G06F 11/1464 |
| 11,734,025 B2* | 8/2023 | Swvigaradoss | ....... | H04L 41/145 |
| | | | | 718/100 |
| 11,740,980 B2* | 8/2023 | Mukku | ................... | G06F 3/065 |
| | | | | 707/649 |
| 11,755,433 B2* | 9/2023 | Chopra | .............. | G06F 11/3055 |
| | | | | 714/4.11 |
| 2008/0086731 A1* | 4/2008 | Trossman | ................. | G06F 9/50 |
| | | | | 718/100 |
| 2009/0292386 A1* | 11/2009 | Cheng | .............. | G05B 19/41875 |
| | | | | 700/109 |
| 2011/0066879 A1* | 3/2011 | Nakai | ....................... | G06F 8/63 |
| | | | | 718/1 |
| 2011/0145816 A1* | 6/2011 | Glikson | .............. | G06F 9/45558 |
| | | | | 718/1 |

(Continued)

*Primary Examiner* — Mehran Kamran
(74) *Attorney, Agent, or Firm* — Amin, Turocy & Watson, LLP

(57) ABSTRACT

Techniques are provided for data-driven virtual machine restoration. In an example, a VM crashes and is to be restored. There can be multiple restoration paths that can be used to recover the VM (e.g., various source locations where a recovery image is stored, various recovery images, and various target locations where a VM can be restored to). A trained prediction model can analyze these various restoration paths and predict which restoration path will have a quickest time to recovery, to minimize a time that the VM is unavailable.

20 Claims, 11 Drawing Sheets

(56) References Cited

U.S. PATENT DOCUMENTS

| | | | |
|---|---|---|---|
| 2012/0192175 A1* | 7/2012 | Dorai | G06F 9/45558 718/1 |
| 2012/0209812 A1* | 8/2012 | Bezbaruah | G06F 11/1484 707/646 |
| 2013/0185667 A1* | 7/2013 | Harper | G06F 11/0709 715/772 |
| 2013/0332771 A1* | 12/2013 | Salapura | G06F 11/1484 714/15 |
| 2014/0095817 A1* | 4/2014 | Hsu | G06F 3/065 711/162 |
| 2014/0149354 A1* | 5/2014 | Chan | G06F 9/455 707/639 |
| 2014/0297597 A1* | 10/2014 | Matsubara | G06F 11/1458 707/681 |
| 2015/0373096 A1* | 12/2015 | Chandrasekaran | H04W 4/023 709/226 |
| 2015/0381723 A1* | 12/2015 | Sancheti | H04L 67/1095 709/217 |
| 2016/0012071 A1* | 1/2016 | Herman | G06F 16/1827 707/649 |
| 2016/0048408 A1* | 2/2016 | Madhu | H04L 47/783 718/1 |
| 2016/0110268 A1* | 4/2016 | Sekiguchi | G06F 11/1469 714/15 |
| 2016/0203013 A1* | 7/2016 | Bayapuneni | G06F 9/45545 718/1 |
| 2017/0315838 A1* | 11/2017 | Nidugala | H04L 43/0817 |
| 2018/0113625 A1* | 4/2018 | Sancheti | G06F 9/45558 |
| 2019/0114231 A1* | 4/2019 | Bishop | G06F 11/1458 |
| 2019/0220444 A1* | 7/2019 | Guo | G06F 9/45558 |
| 2020/0012572 A1* | 1/2020 | Chopra | G06F 21/60 |
| 2020/0034174 A1* | 1/2020 | Singhal | G06F 11/1458 |
| 2020/0097370 A1* | 3/2020 | Srinivasan | G06F 11/1469 |
| 2020/0244678 A1* | 7/2020 | Shua | G06F 21/554 |
| 2020/0272934 A1* | 8/2020 | Manamohan | G06F 11/1438 |
| 2020/0310650 A1* | 10/2020 | Hadas | G06F 3/065 |
| 2020/0334061 A1* | 10/2020 | Zlotnick | G06F 11/1484 |
| 2021/0117868 A1* | 4/2021 | Sriharsha | G06F 16/24568 |
| 2021/0365330 A1* | 11/2021 | Kushnir | G06F 11/1484 |
| 2022/0043721 A1* | 2/2022 | Shemer | G06F 11/1484 |
| 2022/0058527 A1* | 2/2022 | Lavid Ben Lulu | G05B 23/024 |
| 2022/0188138 A1* | 6/2022 | Akkur Rajamannar | G06F 9/5072 |
| 2022/0245036 A1* | 8/2022 | Azaria | G06N 5/04 |
| 2023/0589205 * | 9/2023 | Denny | G06F 9/45558 718/1 |

\* cited by examiner

DATA-DRIVEN VIRTUAL MACHINE RECOVERY

TECHNICAL FIELD

The present application relates generally to recovering a virtual machine (VM) after it crashes or otherwise stops functioning properly, and doing so quickly.

BACKGROUND

A VM can generally comprise an emulated computer system (e.g., as computer-executable instructions) that provides the functionality of a physical computer to a guest operating system that executes within the VM. In some examples, one physical computer system can host multiple VMs. A VM can be moved between physical computer systems. When a VM crashes or otherwise stops operating correctly, it can be recovered from a snapshot, which can generally comprise backup data. In some examples, the VM can be recovered to the physical computer system upon which it was executing, or recovered to a different physical computer system from the physical computer system upon which it was executing.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
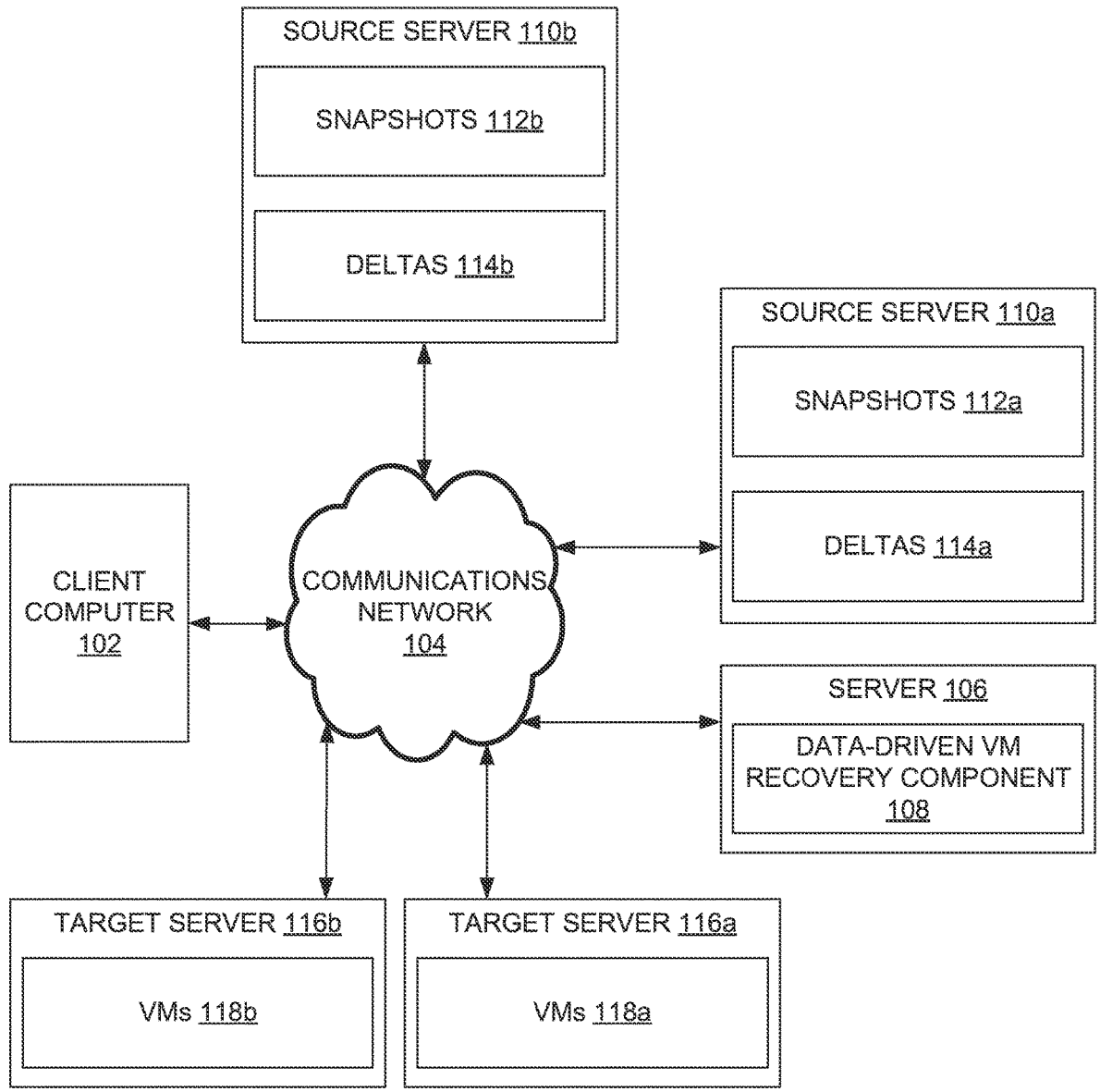
FIG. 1 illustrates an example system architecture that can facilitate data-driven VM recovery, in accordance with certain embodiments of this disclosure.

A challenge in recovering VMs at a time of disaster using a snapshot can be to reduce am amount of time it takes for an entire recovery procedure to complete. It some examples, snapshots are sent to several locations, such as a different site, or cloud storage. In such examples, in the event of disaster, several decisions can be made as part of a recovery process, such as determining that a snapshot is valid, determining a snapshot protection location, and determining a target VM location. These determinations can each impact a recovery process execution time.

A data-driven approach for reducing an amount of time to recover a VM is disclosed herein, where an amount of time to recovery a VM can be predicted based on a snapshot location, a snapshot size, and a target location. This data-driven approach can utilize both historical and near-real-time data for inference. In some examples, once predicted times are determined, a fastest route to recovery can be selected and implemented.

In order to mitigate a risk of data loss due to hardware failures, software failures, or any other unforeseen or unavoidable reasons, organizations can rely on backup solutions so that data can be recovered in a timely manner to carry on uninterrupted business operations. With increasing use of virtual environments that use VMs for hosting different applications and processing data, various solutions have been developed for backup and recovery of VM data to ensure availability of the VMs.

One approach can involve taking VM snapshots on a pre-defined time cadence. A VM snapshot can preserve a state and data of a VM at a specific point in time. This snapshot can facilitate recovery of a protected VM to a state at a previous point in time.

A VM recovery can comprise a process of spinning-up a VM from a pre-selected snapshot at a pre-selected target environment. In some examples, the target can be a vendor cloud, or it can be an on-premise location. When a user triggers a VM recovery the data protection system can perform a recovery workflow that comprises several activities in order to recover the VM. The workflow structure can be dependent on the properties of the snapshot, the location of the snapshot, and the target location the user has chosen.

For example, recovering a snapshot from cloud storage to a vender cloud target environment can involve the following workflow:
1. Rehydrate a full snapshot from an older snapshot and a stream of delta objects;
2. Use a cloud vender import service in order to convert a hypervisor from a first type to a second type;
3. Spin off an instance of the VM.

In an example, recovering a snapshot from cloud storage to an on-premises target can involve the following workflow:
1. Download the snapshot from the cloud storage to on-premises storage;
2. Spin off a VM on-premises.

Each different recovery workflow can take a different amount of time to implement. Moreover, each activity can take a different amount of time in different conditions.

For example, a cloud vender import service can be affected by factors such as a load on the service, and an operating system type of the VM. In another example, downloading a snapshot from cloud storage to on-premises storage can be affected by factors such as a load on the network connection, and a size of the snapshot.

An amount of time that it takes to recover a VM can be crucial. For example, an important metric of a data recovery system can be a Recovery Time Objective (RTO). The RTO can be a targeted duration of time and a service level within which a VM must be restored after a disaster in order to avoid unacceptable consequences associated with a break in business continuity. Reducing a RTO can be highly important, and much effort and money can be spent toward achieving that.

An example high-level architecture of a data protection system for VMs can comprise the following components. Such an architecture can include a VM's environment, snapshot storage, a protection agent, a recovery manager, and a recovery target, A VM's environment can comprise VMs that a customer wishes to protect. This can be, for example, a VMWARE VCENTER environment.

Snapshot storage can comprise a place on which the snapshots are stored. In some examples, this can be a local storage such as a Data Domain, or a cloud storage.

A protection agent can monitor the VMs, create snapshots, and store those snapshots at a snapshot storage according to a pre-defined policy.

A recovery manager can be responsible for managing a recovery workflow. A recovery manager can be located off-site. When a recovery manager is located off-site, it hopefully will not be influenced by the disaster that affects the site. For example, an off-site location can be a public cloud. There can be multiple implementations of a recovery manager. A recovery manager can be implemented as software as a service (SaaS), where it is multi-tenancy and is configured to serve multiple customers. Another implementation of a recovery manager can be a recovery manager that is owned by a single customer and that serves that single customer.

A recovery target can comprise environment on which the recovered VM can be spun up. A recovery target can be a second VCENTER or part of a cloud platform.

In such a system architecture, a fastest recovery path for a VM can be determined. Take the following, in an example. Let V be a VM, $SN_i \in \{SN1 \ldots SNn\}$ its snapshots, S a source location of $SN_i$ and T a target location. A predicted amount of time it will take to recover V from snapshot $SN_i$ at location S to target location T can be determined.

At a time of a real disaster, business continuity can be crucial. One of the factors to achieve business continuity can be reducing a recovery workflow execution time. A solution to this can give a user or machine an ability to get a prediction for each recovery path it considers, where the shortest recovery path (in terms of time) can be selected and implemented.

Approaches according to the present techniques can utilize supervised learning by training a regression model in order to predict a recovery workflow execution duration.

A data protection system can generate detailed logs such that every execution of a recovery workflow provides labeled data for a supervised learning model. In order to obtain enough data, the following can be implemented:

If the recovery manager is implemented via SaaS and serves many costumers, it can be safe to assume that over time the recovery manager will have enough data to train the models.

If the recovery manager is a private agent, the recovery manager can send logs to a central location where the logs can be analyzed.

Data augmentation. With data augmentation, multiple recovery workflows can be triggered in a testing lab environment under different conditions, and the resulting logs can be collected.

The following are example data features that can be collected.

Snapshot Overall Size—A size of a snapshot in bytes.

Snapshot Number Of Diffs—A number of delta objects associated with a snapshot, where a snapshot is saved as a base full copy and a series of delta objects that identify changes to the snapshot over time.

Average Size of Diff—An average size of a snapshot's delta objects.

Snapshot OS Type—A type of operation system installed on the VM.

Start Time—The recovery start time.

Day of Week—The day on which the recovery take place.

Working Day—Whether the day of the recovery is a working day (e.g., a weekday and not a holiday).

Source and Target Location—The source and target locations of the snapshot.

Instance Type—The type of the target instance used, where the target location is a public cloud.

Ping Time—A ping sent to network endpoint used during the recovery execution.

A label for these features can then be Overall Time—A duration of recovery execution time.

It can be appreciated that other data features can be utilized according to these techniques.

In some examples, each selection (S, T, SN), where is the source location, T, is the target location and SN is a snapshot, can indicate a type of the recovery workflow. Since, in some examples, a data protection system will have no more than a few workflows and each one is quite unique, a different model can be trained for each workflow.

For each workflow, features that have influence on its execution time can be utilized. Each workflow can have a different set of features, which can be of two types.

The model can be used that yields a best result. Example models can include linear regression, and tree-based approaches.

Model training can be based on historical data—for example, data collected from the last six months. The model can be re-trained periodically with a cadence that provides good results. A cadence can be for example one, three, or six days. An additional option can be to give newer data samples a higher weight, by assuming that their importance is bigger.

Given a VM to recover, a suitable model can be applied on the recovery options. This can give a user an easy way to choose a fastest option overall, or with a set of constrains—for example, a fastest option to a specific target location.

In some examples, implementing the present techniques can provide advantages. An advantage can be automatic recommendation, as opposed to currently where a user might blindly choose a snapshot and a target location without knowing in advance an amount of time it will take for the snapshot to recover. Another advantage can be in the use of historical and real-time data usage for observation to make inferences. Another advantage can be of faster recovery, where applying the data-driven techniques can lead to choosing a faster or fastest way to recover the VM, which can be critical for VMs running crucial applications. Another advantage can be to elevate customer satisfaction and loyalty. That is, giving customers solutions that perform faster and hold service level agreements (SLAs) can elevate customer satisfaction and loyalty.

Example Architectures

FIG. 1 illustrates an example system architecture 100 that can architecture that can facilitate data-driven VM recovery, in accordance with certain embodiments of this disclosure.

System architecture comprises client computer 102, communications network 104, server 106, source server 110a, source server 110b, target server 116a, and target server 116b. In turn, server 106 comprises data-driven VM recovery component 108. Source server 110a comprises snapshots 112a and deltas 114a. Source server 110b comprises snapshots 112b and deltas 114a. Target server 116a comprises VMs 118a. Target server 116b comprises VMs 118b.

Figure 11:
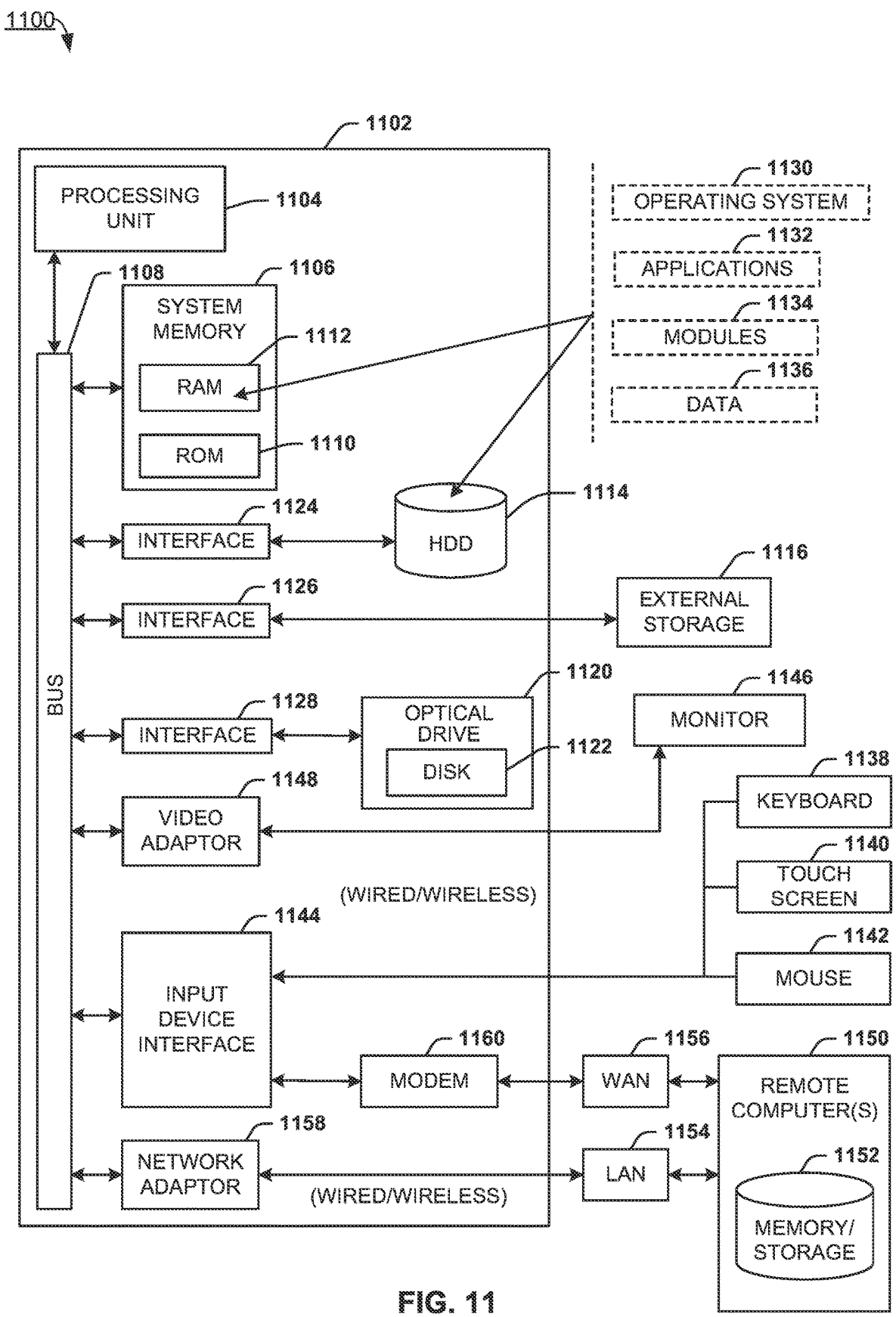
FIG. 11 illustrates an example block diagram of a computer operable to execute certain embodiments of this disclosure.

In some examples, each of client computer 102, server 106, data-driven VM recovery component 108, source server 110a, source server 110b, target server 116a, and target server 116b can be implemented with machine-executable instructions and/or aspects of computer 1102 of FIG. 11.

Communications network 104 can comprise a computer communications network, such as the INTERNET, or an isolated private computer communications network.

Snapshots 112a and snapshots 112b can each comprise one or more snapshots of VMs. A snapshot can generally comprise a data backup of a computer (or VM) at a point in time. There can be multiple candidate snapshots for recovering a VM. For example, multiple copies of one snapshot can be stored at different locations. In some examples, a first snapshot can be a copy of a second snapshot after one or more deltas are applied to the second snapshot.

In some examples, snapshots from different points in time can be considered. There could be a ransomware infection on the VM that leads to selecting a snapshot older than the most-recent snapshot, and among these older snapshots, VM recovery can be prioritized above having the newest snapshot that is not infected with the ransomware.

Deltas 114a and deltas 114b can each comprise one or more deltas for VM snapshots. Deltas can sometimes be referred to as delta objects, or diffs. A delta can reflect changes made to a computer of VM being backed up since a previous snapshot or delta of that computer or VM was taken. A snapshot (sometimes referred to as a base image) can be combined with one or more subsequent deltas to recreate a backup of the VM at a given point in time.

In some examples, a full snapshot can be taken on a first cadence, and deltas can be taken on a second cadence that is more rapid than the first cadence. That is, a full snapshot can be taken every 30 minutes, with a delta for the most recent snapshot taken every five minutes in between taking snapshots.

VMs 118a and VMs 118b can each comprise one or more VMs. A VM can generally comprise an emulated computer system that executes on physical computing hardware, and present functionality used to execute an operating system.

In system architecture 100, there can be multiple restoration paths for a given VM. For example, it can be that a backup of a given VM is stored on both source server 110a and source server 110b, in snapshots 112a and deltas 114a or snapshots 112b and deltas 114b, respectively. And it can be that a suitable target to host the recovered VM can be either target server 116a or target server 116b.

With multiple source servers (which can each store multiple suitable VMs for recovery) and multiple target servers, there can be multiple possible recovery paths, where a recovery path comprises a source location, a backup image, and a target location.

When a VM crashes, data-driven VM recovery component 108 can predict which restoration path can be used to achieve a fastest recovery of the VM.

In doing so, data-driven VM recovery component 108 can utilize both real-time data and history data in selecting a restoration path. Realtime data can include data such as information about a current backlog for a service that converts hypervisors between types (which can be obtained by querying the hypervisor-conversion service for that information). This real-time information can also be stored over time as history information.

Additionally, in selecting a restoration path, data-driven VM recovery component 108 can utilize a trained prediction model. The trained prediction model can take information about potential restoration paths, and from that, identify a restoration path that is predicted to lead to a fastest recovery time for the VM.

The trained prediction model can be trained using supervised machine learning. The input can be labeled features that identify various information about restoration pathways (such as source and target information, instance type, and snapshot overall size) along with the label that identifies how much time restoring a VM via a restoration pathway with those features took.

An output of a trained prediction model can be a predicted amount of time that each candidate restoration path will take for recovering the VM. From this output, data-driven VM recovery component 108 can the restoration path with a fastest predicted time, and use that selected restoration path for recovering the VM.

Figure 6:
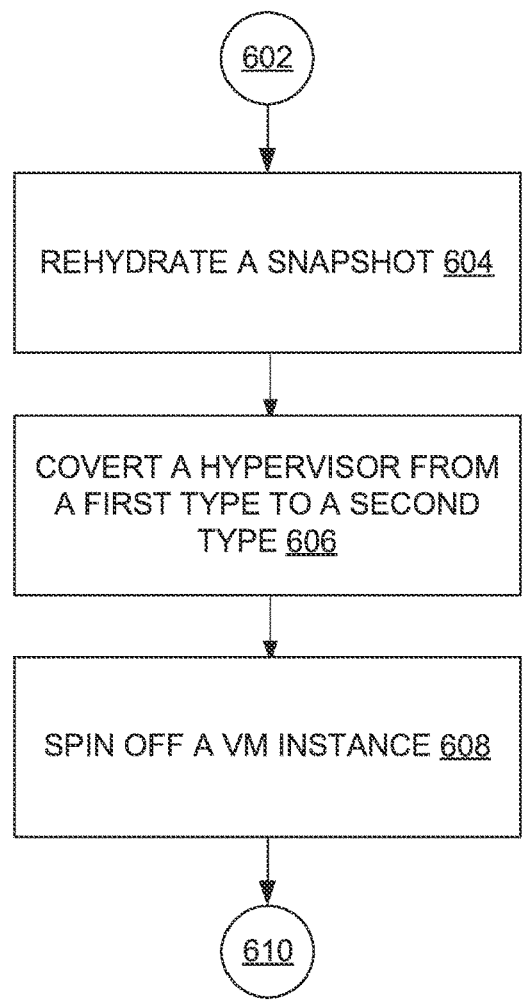
FIG. 6 illustrates an example process flow for recovering a VM via a first recovery pathway that can facilitate data-driven VM recovery, in accordance with certain embodiments of this disclosure.
Figure 7:
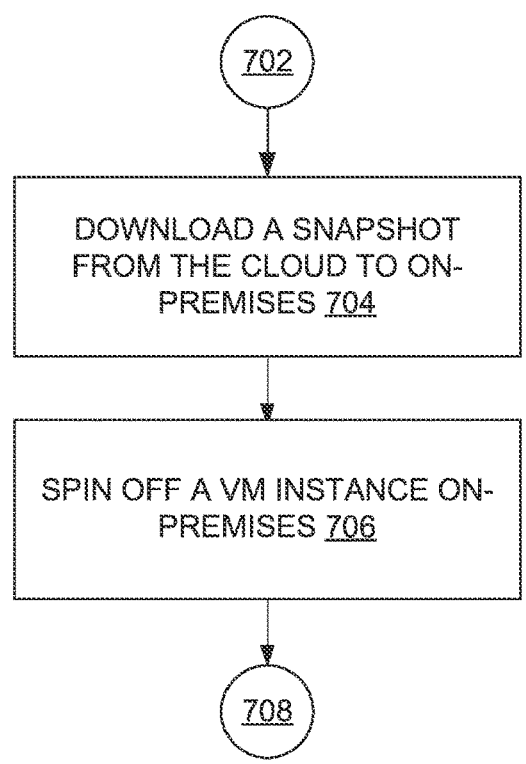
FIG. 7 illustrates an example process flow for recovering a VM via a second recovery pathway that can facilitate data-driven VM recovery, in accordance with certain embodiments of this disclosure.
Figure 8:
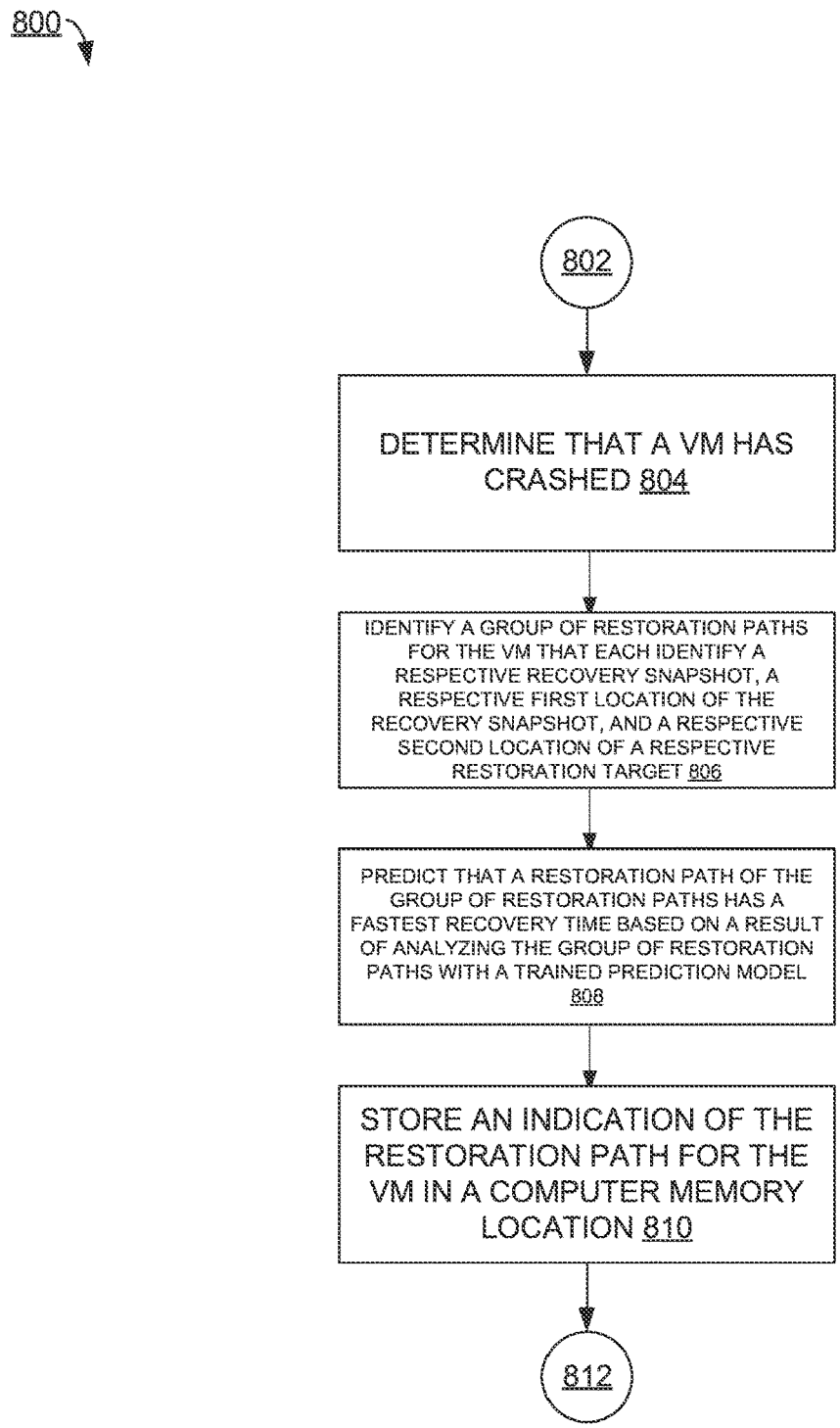
FIG. 8 illustrates an example process flow for data-driven VM recovery, in accordance with certain embodiments of this disclosure.
Figure 9:
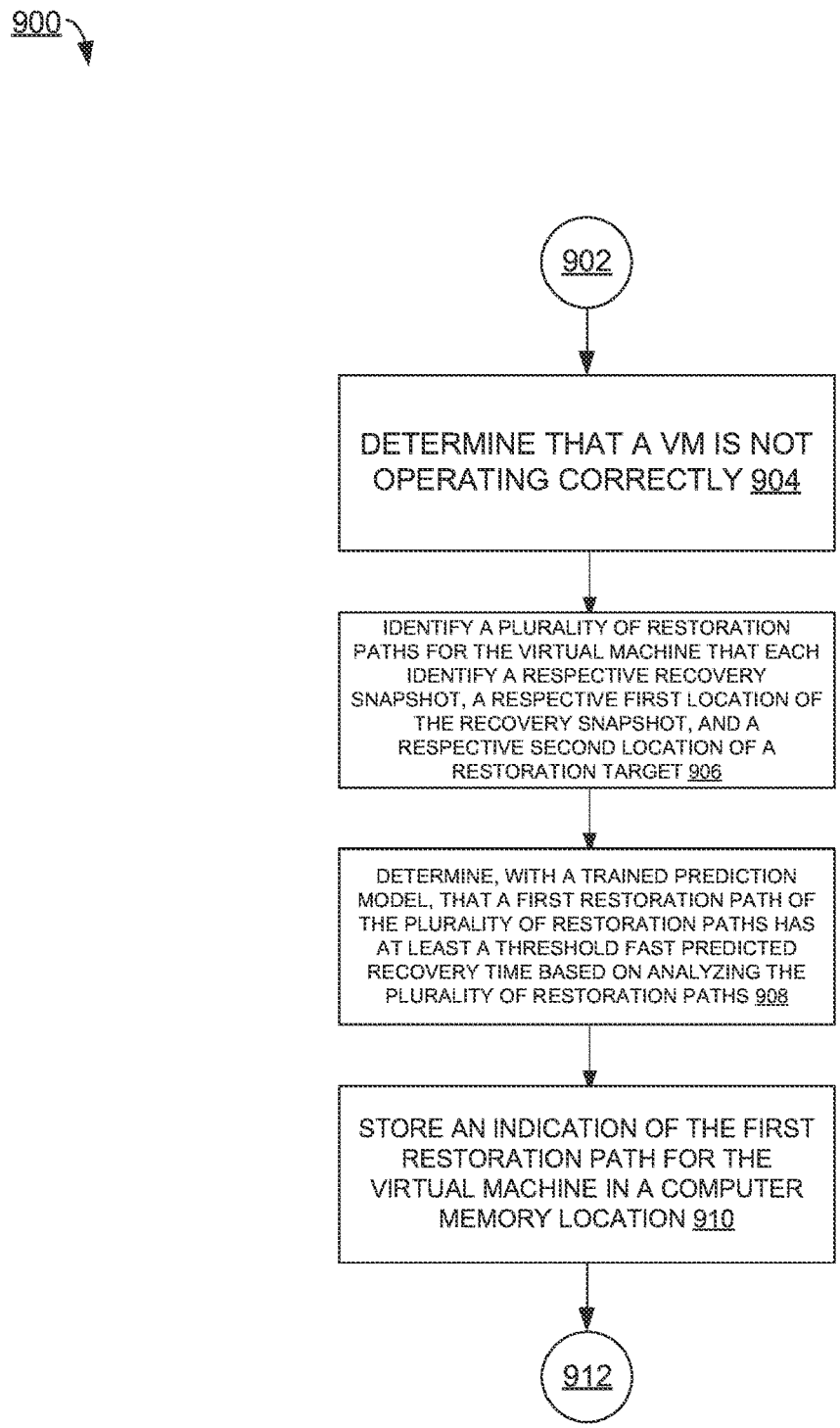
FIG. 9 illustrates another example process flow for data-driven VM recovery, in accordance with certain embodiments of this disclosure.
Figure 10:
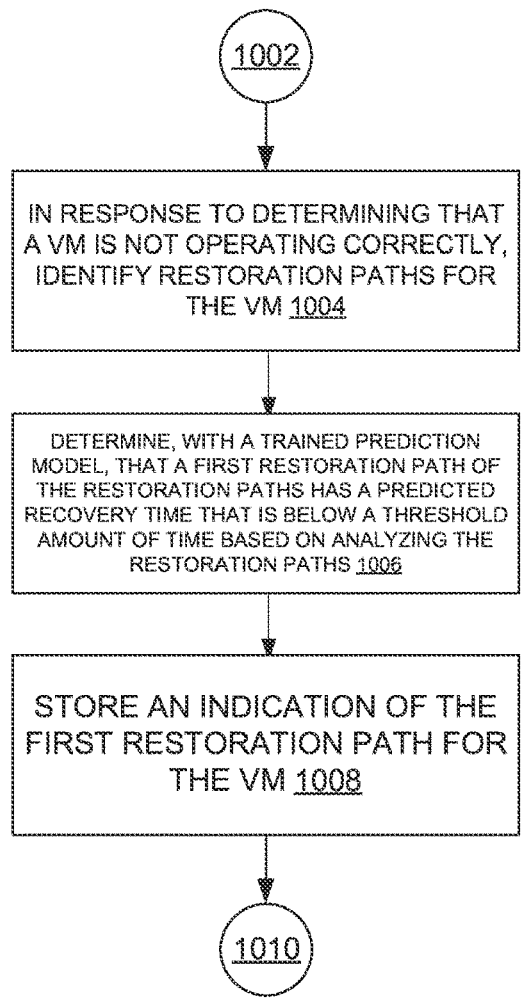
FIG. 10 illustrates another example process flow for data-driven VM recovery, in accordance with certain embodiments of this disclosure.

In implementing organization adjustment in this manner, data-driven VM recovery component 108 can implement aspects of process flow 600 of FIG. 6, process flow 700 of FIG. 7, process flow 800 of FIG. 8, process flow 900 of FIG. 9, and process flow 1000 of FIG. 10.

Client computer 102 can access computing resources (e.g., computing storage resources) of a VM (e.g., a VM of VMs 120a) via communications network 104. When that VM fails, data-driven VM recovery component can quickly recover the VM so as to minimize a time when that VM is unavailable to provide access to computing resources to client computer 102 or to other computers.

Figure 2:
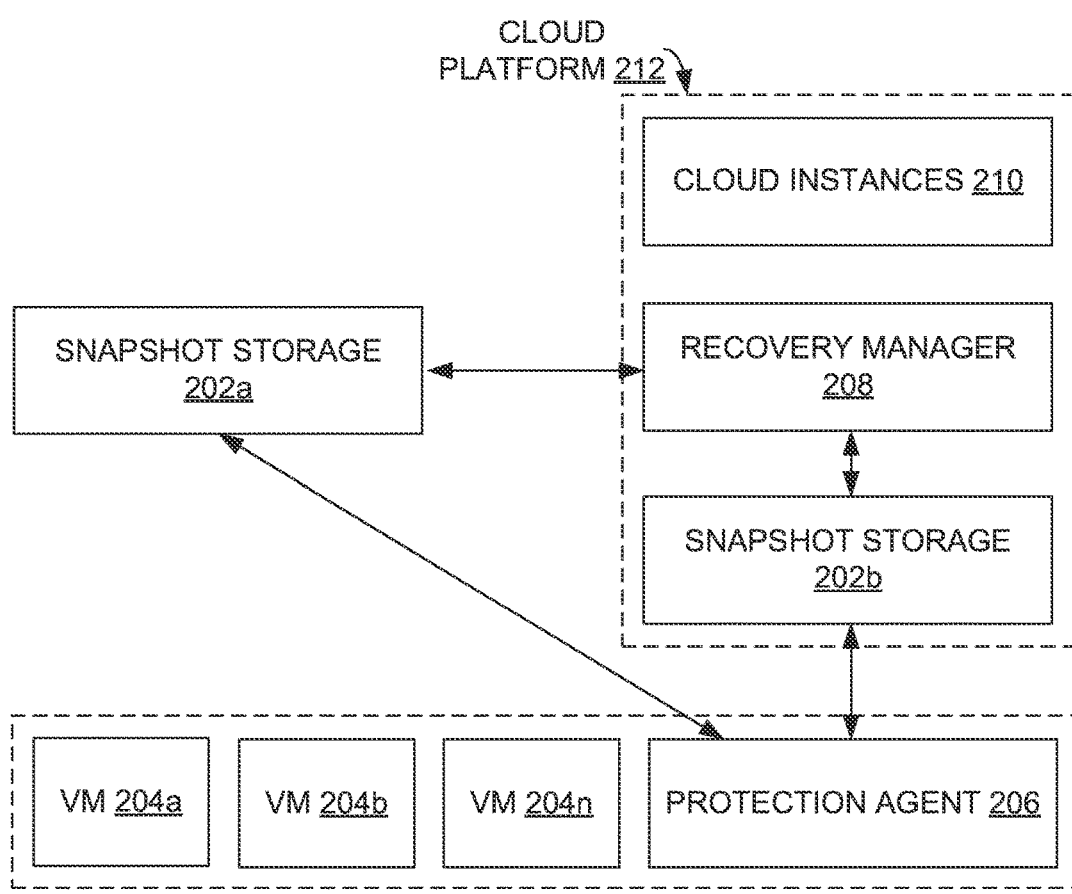
FIG. 2 illustrates another example system architecture that can facilitate data-VM recovery, in accordance with certain embodiments of this disclosure.

FIG. 2 illustrates another example system architecture 200 that can facilitate data-VM recovery, in accordance with certain embodiments of this disclosure. As depicted, system architecture 200 comprises snapshot storage 202a, VM 204a, VM 204b, VM 204n, protection agent 206, and cloud platform 212. In turn, cloud platform 212 comprises snapshot storage 202b, recovery manager 208, and cloud instances 210.

Snapshot storage 202a and snapshot storage 202b can each be similar to source server 110a of FIG. 1 (comprising snapshots 112a and deltas 114a) and/or source server 110b comprises (snapshots 112b and deltas 114a).

VM 204a, VM 204b, and VM 204n can each be similar to VMs 118a of FIG. 1 and/or VMs 118b. Cloud instances 210 can comprise VM instances that are hosted on a cloud platform, and can be similar to VMs 118a of FIG. 1 and/or VMs 118b.

Cloud platform 212 can comprise one or more instances of aspects of computer 1102 of FIG. 11.

Protection agent 206 can monitor the VM 204a, VM 204b, and VM 204n, create snapshots, and store those snapshots at snapshot storage 202a and snapshot storage 202b according to a pre-defined policy.

Recovery manager 208 can be responsible for managing a recovery workflow to recover a VM after it crashes. In some examples, recovery manager 208 can be similar to data-driven VM recovery component 108 of FIG. 1.

Figure 3:
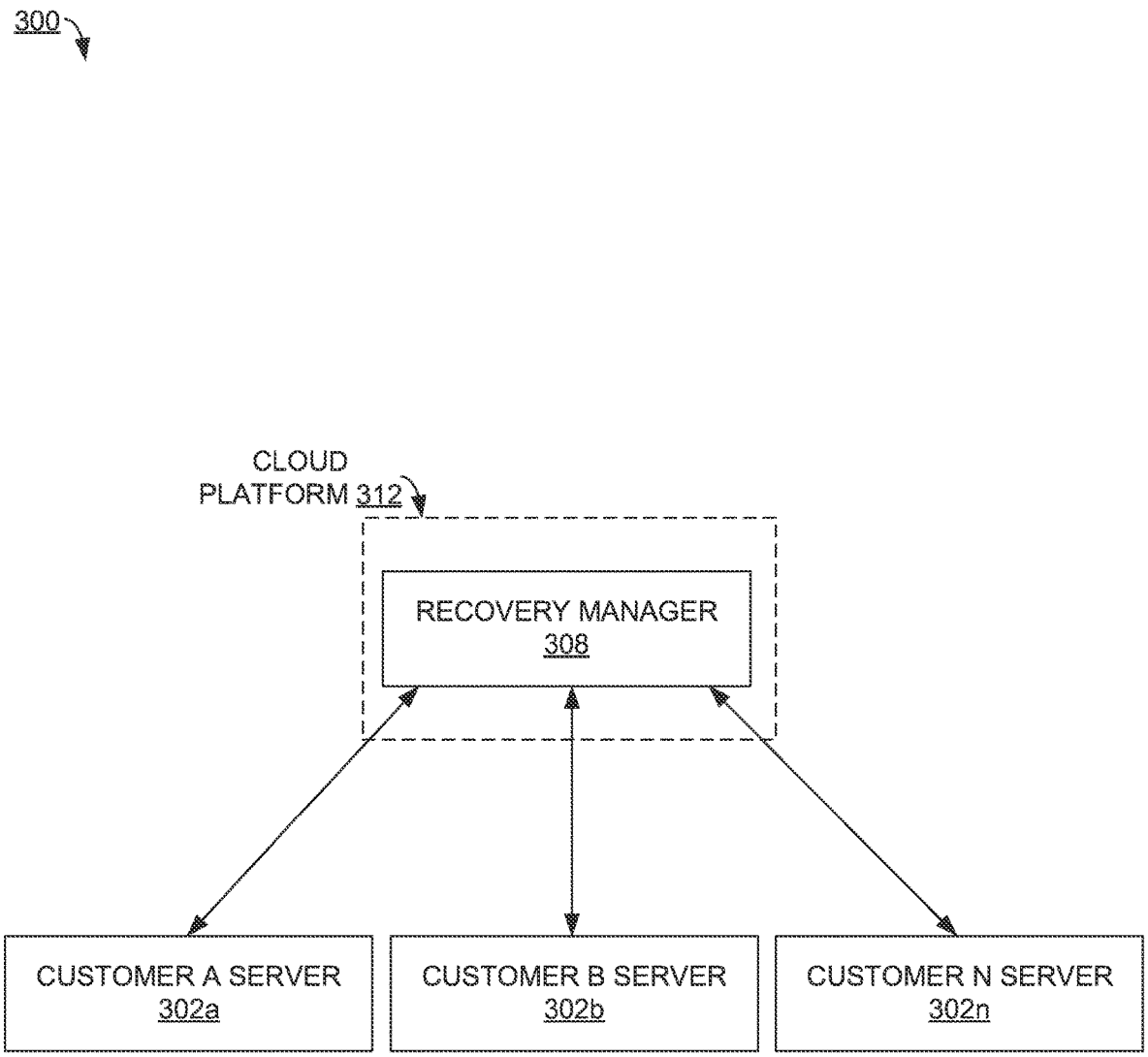
FIG. 3 illustrates an example system architecture of a multi-tenant recovery manager that can facilitate data-driven VM recovery, in accordance with certain embodiments of this disclosure.

FIG. 3 illustrates an example system architecture 300 of a mu recovery manager that can facilitate data-driven VM recovery, in accordance with certain embodiments of this disclosure. System architecture 300 comprises customer A server 302a, customer B server 302b, customer N server 302n, and cloud platform 312 (which comprises recovery manager 308). Each of customer A server 302a, customer B server 302b, and customer N server 302n can host VMs for the respective customers, and be implemented with aspects of one or more instances of computer 1102 of FIG. 11.

Cloud platform 312 can be similar to cloud platform 212 of FIG. 2, and recovery manager 308 can be similar to recovery manager 208.

In system architecture 300, recovery manager 308 can handle VM recovery for multiple different customers—e.g., for each of customer A server 302a, customer B server 302b, and customer N server 302n—by selecting a restoration path. This multi-tenant recovery manager can be viewed in contrast to the single-tenant recovery manager of FIG. 4.

Figure 4:
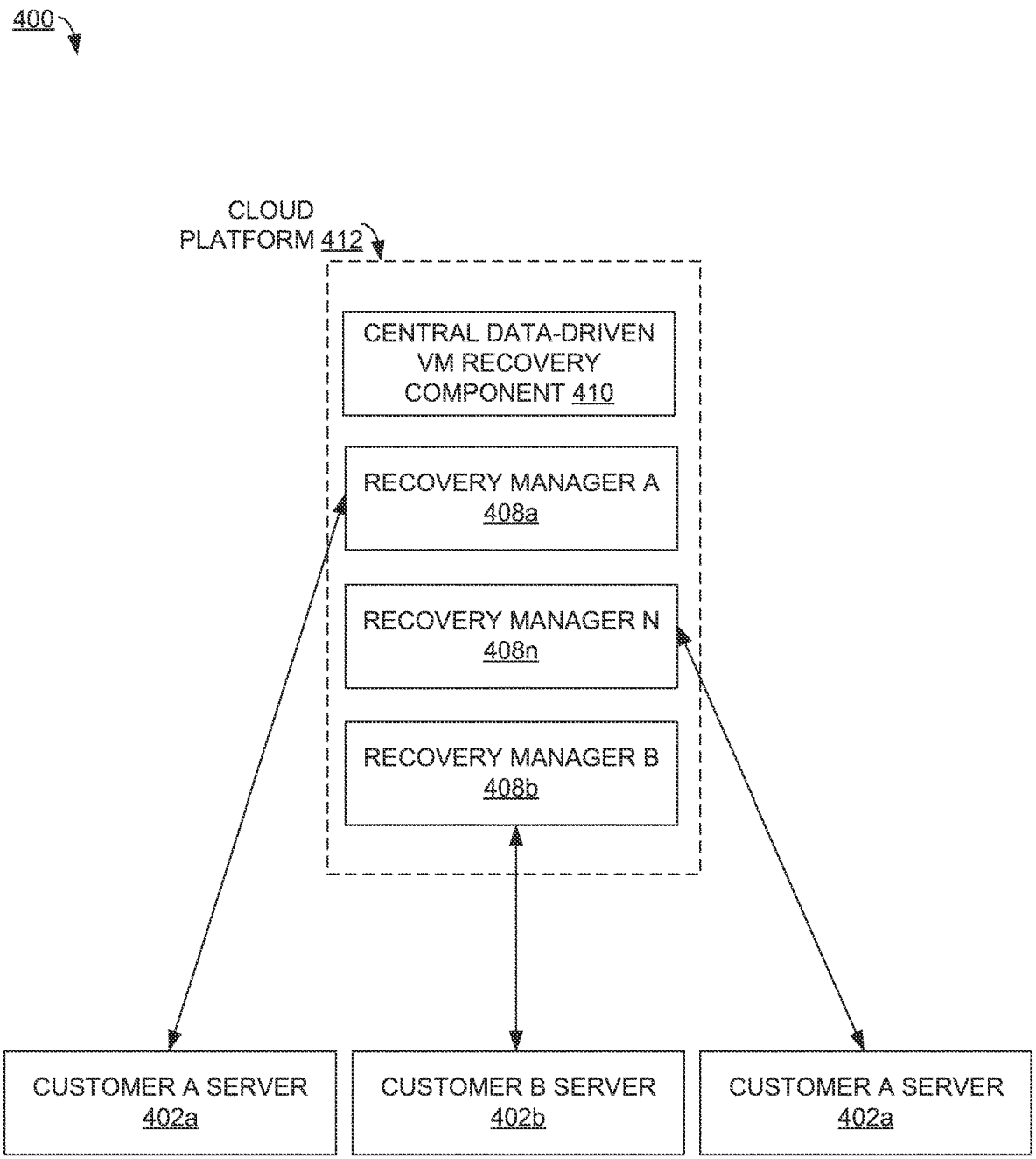
FIG. 4 illustrates an example system architecture of a single-tenant recovery manager that can facilitate data-driven VM recovery, in accordance with certain embodiments of this disclosure.

FIG. 4 illustrates an example system architecture 400 of a single-tenant recovery manager that can facilitate data-driven VM recovery, in accordance with certain embodiments of this disclosure. System architecture 400 comprises customer A server 402a (which can be similar to customer A server 302a of FIG. 3), customer B server 402b (which can be similar to customer B server 302b of FIG. 3), customer N server 302n (which can be similar to customer N server 402n of FIG. 3), and cloud platform 412 (which can be similar to cloud platform 412 of FIG. 4).

In turn, cloud platform 412 can comprise recovery manager A 408a, recovery manager B 408b, recovery manager N 408n, and central data-driven VM recovery component 410. In some examples, central data-driven VM recovery component 410 can be implemented with machine-executable instructions and/or aspects of computer 1102 of FIG. 11.

Each of recovery manager A 408a, recovery manager B 408b, recovery manager N 408n can be similar to recovery manager 308 of FIG. 3, and can each provide services to a different customer in a single-tenant manner. That is, recovery manager A 408a, recovery manager B 408b, recovery manager N 408n can each provide recovery manager services to customer A server 402a, customer B server 402b, and customer N server 302n, respectively.

To provide each recovery manager with a trained prediction model that has been trained with sufficient data, each of recovery manager A 408a, recovery manager B 408b, recovery manager N 408n can send relevant data to central data-driven VM recovery component 410. Central data-driven VM recovery component 410 can use this data to train a trained prediction model, and supply corresponding weights for the trained prediction model back to each of recovery manager A 408a, recovery manager B 408b, recovery manager N 408n. Each of recovery manager A 408a, recovery manager B 408b, recovery manager N 408n can use these weights for their respective trained prediction model in performing data-driven VM recovery.

A difference between system architecture 300 of FIG. 3 and system architecture 400 of FIG. 4 can be a difference between a multi-tenant architecture and a single-tenant architecture. System architecture 300 can be considered to be multi-tenant, where each customer has an on-premises protection agent that sends VMs to a cloud platform for execution. Each customer, or user, can send information to a central recovery manager. This central recovery manager can have data about recovery times using various restoration paths from many customers from which to train a prediction model.

Then, system architecture 400 can be considered to be single-tenant, where each customer can install its own instance of a recovery manager on a cloud platform. In some examples, each recovery manager instance can lack sufficient data (since it receives data from one customers, in contrast to multiple customers in the multi-tenant example) to select a restoration path well. In such examples, each recovery manager instance can send data to a central component that can collect that data from multiple customers, train a prediction model, and send back weights for a trained prediction model to each recovery manager instance. That is, a difference between a multi-tenant architecture and a single-tenant architecture can be in how a data set is obtained for training a prediction model.

Figure 5:
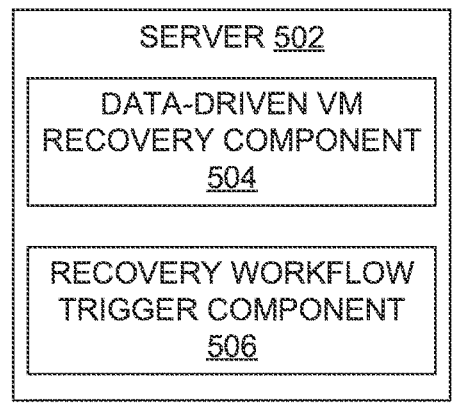
FIG. 5 illustrates an example system architecture for training a recovery manager that can facilitate data-driven VM recovery, in accordance with certain embodiments of this disclosure.

FIG. 5 illustrates an example system architecture 500 for training a recovery manager that can facilitate data-driven VM recovery, in accordance with certain embodiments of this disclosure. System architecture 500 comprises server 502, which in turn comprises data-driven VM recovery component 504, and recovery workflow trigger component 506.

In some examples, server 502 can be implemented with aspects of one or more instances of computer 1102 of FIG. 11. In some examples, data-driven VM recovery component 504 can be similar to data-driven VM recovery component 108 of FIG. 1. In some examples, recovery workflow trigger component 506 can be implemented with machine-executable instructions and/or aspects of computer 1102 of FIG. 11.

Recovery workflow trigger component 506 can trigger VM recoveries for data-driven VM recovery component 504 to handle by recovering a corresponding VM. In some examples, recovery workflow trigger component 506 can cause a VM monitored by data-driven VM recovery component 504 to crash, which can trigger data-driven VM recovery component 504 to perform a VM recovery. In other examples, recovery workflow trigger component 506 can indicate to data-driven VM recovery component 504 to perform a recovery, without a VM actually having crashed.

That is, recovery workflow trigger component 506 can cause data-driven VM recovery component 504 to perform various VM recoveries, which data-driven VM recovery component 504 can use to generate data for labeled training data to train a prediction model. In this manner, data-driven VM recovery component 504 can train its prediction model in a lab-type setting, without involving actual real-world VM crashes. When data-driven VM recovery component 504 has trained a prediction model, data-driven VM recovery component 504 can supply corresponding weights for the prediction model to a data-driven VM recovery component that is operating on live VMs, such as data-driven VM recovery component 108 of FIG. 1, recovery manager 208 of FIG. 2, recovery manager 308 of FIG. 3, and/or recovery manager 408 of FIG. 4.

Each of these other recovery managers can use these weights for their respective prediction model, to perform data-driven VM recovery on crashed VMs that they supervise.

In some examples, recovery workflow trigger component 506 can cause data-driven VM recovery component 504 can work in concert to periodically update weights for the prediction model, and supply these updated weights to a recovery manager.

Example Process Flows

FIG. 6 illustrates an example process flow 600 for recovering a VM via a first recovery pathway that can facilitate data-driven VM recovery, in accordance with certain embodiments of this disclosure. In some examples, aspects of process flow 600 can be implemented by data-driven VM recovery component 108 of FIG. 1, recovery manager 208 of FIG. 2, or computing environment 1100 of FIG. 11.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with aspects of one or more of process flow 700 of FIG. 7, process flow 800 of FIG. 8, process flow 900 of FIG. 9, and process flow 1000 of FIG. 10.

Process flow 600 begins with 602, and moves to operation 604. Operation 604 depicts rehydrating a snapshot. In some examples, rehydrating a snapshot can comprise combining a base snapshot image with one or more deltas to produce a snapshot image reflective of a snapshot at a later time than is reflected in the base snapshot image. After operation 604, process flow 600 moves to operation 606.

Operation 606 depicts converting a hypervisor from a first type to a second type. A hypervisor can generally comprise executable computer instructions in which a VM run, and which provide the VM with services as though it had the only operating system operating on a given computer system. Different platforms (e.g., on-premises hardware, or cloud platforms from various venders) can be configured to use different types of hypervisors (e.g., various type of VMWARE hypervisors, or types of hypervisors from different providers). In examples where different types of hypervisors are used between the hypervisor type used when the snapshot was taken, and the hypervisor type to be used on the target system, a conversion can be made between these two types of hypervisors. After operation 606, process flow 600 moves to operation 608.

Operation 608 depicts spinning off a VM instance. This can comprise starting up the VM instance from the rehydrated snapshot in the hypervisor on a computer system, so that the VM is recovered. After operation 608, process flow 600 moves to 610, where process flow 600 ends.

FIG. 7 illustrates an example process flow 700 for recovering a VM via a second recovery pathway that can facilitate data-driven VM recovery, in accordance with certain embodiments of this disclosure. In some examples, aspects of process flow 700 can be implemented by data-driven VM recovery component 108 of FIG. 1, recovery manager 208 of FIG. 2, or computing environment 1100 of FIG. 11.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with aspects of one or more of process flow 600 of FIG. 6, process flow 800 of FIG. 8, process flow 900 of FIG. 9, and process flow 1000 of FIG. 10.

Process flow 700 begins with 702, and moves to operation 704. Operation 704 depicts downloading a snapshot (and possibly one or more corresponding deltas, which can also be stored on different systems) from the cloud to on-premises. In some examples, this can comprise data-driven VM recovery component 108 of FIG. 1 sending instructions to a source cloud platform on which the snapshot is stored to transfer the snapshot to a target on-premises system on which the VM will be recovered (using the snapshot).

In some examples, data-driven VM recovery component 108 of FIG. 1 can first download the snapshot from the cloud platform and then upload the snapshot to the on-premises system. In other examples, data-driven VM recovery component 108 of FIG. 1 can instruct the cloud platform to transfer the VM directly to the on-premises platform. After operation 704, process flow 700 moves to operation 706.

Operation 706 depicts spinning off a VM instance on-premises. In some examples, operation 706 can be implemented in a similar manner as operation 608 of FIG. 6. After operation 706, process flow 700 moves to 708, where process flow 700 ends.

FIGS. 6 and 7 give two different example restoration paths that can be used to recover a particular VM. When recovering a VM, data-driven VM recovery component 108 of FIG. 1 can evaluate multiple different restoration paths, such as depicted in FIGS. 6 and 7, to select one for recovering the VM.

FIG. 8 illustrates an example process flow 800 for data-driven VM recovery, in accordance with certain embodiments of this disclosure. In some examples, aspects of process flow 800 can be implemented by data-driven VM recovery component 108 of FIG. 1, recovery manager 208 of FIG. 2, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with aspects of one or more of process flow 600 of FIG. 6, process flow 700 of FIG. 7, process flow 900 of FIG. 9, and process flow 1000 of FIG. 10.

Process flow 800 begins with 802, and moves to operation 804. Operation 804 depicts determining that a VM has crashed. This can comprise protection agent 206 of FIG. 2 determining that a VM (e.g., VM 204a) has ceased to function properly, and sending an indication of this to recovery manager 208. After operation 804, process flow 800 moves to operation 806.

Operation 806 depicts identifying a group of restoration paths for the VM that each identify a respective recovery snapshot, a respective first location of the recovery snapshot, and a respective second location of a respective restoration target. There may be multiple possible recovery paths to recover a particular VM. A snapshot for the VM can be stored at multiple different locations. Each of these snapshots can be configured for one of multiple hypervisors, or have one or more delta images to be applied to it. The VM can be restored to multiple possible target locations. These various combinations of a source location, the snapshot itself, and a target location can comprise a restoration path, and there can be a different amount of time associated with implementing each restoration path to restore the VM. After operation 806, process flow 800 moves to operation 808.

Operation 808 depicts predicting that a restoration path of the group of restoration paths has a fastest recovery time based on a result of analyzing the group of restoration paths with a trained prediction model. A trained prediction model can take information about a restoration path (e.g., a source, a snapshot, and a target), as well as other information about a system (e.g., network bandwidth to a particular target), and from that predict how much time it would take to recover the VM with that restoration path.

In some examples, the trained prediction model was trained based on historical restoration data from a predetermined most-recent amount of time, and wherein the historical restoration data identifies historical recovery paths and corresponding amounts of time for recovery for the historical recovery paths. That is, the trained prediction model can be trained with historical data.

In some examples, operation 808 comprises periodically retraining the trained prediction model with additional historical restoration data that was generated subsequent to the trained prediction model being trained based on the historical restoration data. That is, as new restoration data is determined (i.e., new restorations take place and are analyzed), the trained prediction model can be periodically retrained with this new information.

In some examples, training the trained prediction model can comprise assigning a higher weight to newer data in the historical restoration data relative to older data in the historical restoration data. That is, during training, newer data can be weighted higher than older data.

After operation 808, process flow 800 moves to operation 810.

Operation 810 depicts storing an indication of the restoration path for the VM in a computer memory location. This can comprise data-driven VM recovery component 108 of FIG. 1 storing an indication of the recovery path in a computer memory of server 106. This indication can also be used to identify the recovery path to be used to actually recover the VM.

In some examples, the VM is a first VM, and the restoration path identifies a first recovery snapshot, a third location of the first recovery snapshot, and a fourth location of the respective restoration target. In such examples, operation 810 can comprise starting a second VM at the fourth location with the first recovery snapshot stored at the third location. That is, operation 810 can comprise recovering the VM using the restoration path identified in operation 808.

In some examples, starting the second VM can comprise combining a base snapshot image and at least one delta image to produce the first recovery snapshot. That is, a recovery image can comprise a base snapshot and one or more deltas, and the base snapshot and deltas can be combined to produce a recovery image.

In some examples, starting the second VM can comprise converting a hypervisor from a first type to a second type. This can be performed in a similar manner as operation 606 of FIG. 6.

After operation 810, process flow 800 moves to 812, where process flow 800 ends.

FIG. 9 illustrates another example process flow 900 for data-driven VM recovery, in accordance with certain embodiments of this disclosure. In some examples, aspects of process flow 900 can be implemented by data-driven VM recovery component 108 of FIG. 1, recovery manager 208 of FIG. 2, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with aspects of one or more of process flow 600 of FIG. 6, process flow 700 of FIG. 7, process flow 800 of FIG. 8, and process flow 1000 of FIG. 10.

Process flow 900 begins with 902, and moves to operation 904. Operation 904 depicts determining that a VM is not operating correctly. In some examples, operation 904 can be implemented in a similar manner as operation 804 of FIG. 8.

After operation 904, process flow 900 moves to operation 906.

Operation 906 depicts identifying a plurality of restoration paths for the virtual machine that each identify a respective recovery snapshot, a respective first location of the recovery snapshot, and a respective second location of a restoration target. In some examples, operation 906 can be implemented in a similar manner as operation 806 of FIG. 8.

In some examples, operation 906 comprises receiving user input indicative of the second location of the restoration target, and discarding restoration paths of the plurality of restoration paths that recover to locations other than the second location. That is, user input can be received that specifies a recovery target, and only restoration paths that use that recovery target can then be considered.

After operation 906, process flow 900 moves to operation 908.

Operation 908 depicts determining, with a trained prediction model, that a first restoration path of the plurality of restoration paths has at least a threshold fast predicted recovery time based on analyzing the plurality of restoration paths. In some examples, operation 908 can be implemented in a similar manner as operation 808 of FIG. 8.

In some examples, the trained prediction model analyzes a snapshot size, a network connection load, and whether the recovery snapshot comprises a base snapshot image, and at least one delta image. In some examples, the second location of the restoration target is a cloud computing service, and the trained prediction model analyzes a load of the cloud computing service. In some examples, the second location of the restoration target is a cloud computing service, and the trained prediction model analyzes an operating system of the VM.

After operation 908, process flow 900 moves to operation 910.

Operation 910 depicts storing an indication of the first restoration path for the virtual machine in a computer memory location. In some examples, operation 910 can be implemented in a similar manner as operation 810 of FIG. 8.

After operation 910, process flow 900 moves to 912, where process flow 900 ends.

FIG. 10 illustrates another example process flow 1000 for data-driven VM recovery, in accordance with certain embodiments of this disclosure. In some examples, aspects of process flow 1000 can be implemented by data-driven VM recovery component 108 of FIG. 1, recovery manager 208 of FIG. 2, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with aspects of one or more of process flow 600 of FIG. 6, process flow 700 of FIG. 7, process flow 800 of FIG. 8, and process flow 900 of FIG. 9.

Process flow 1000 begins with 1002, and moves to operation 1004. Operation 1004 depicts, in response to determining that a VM is not operating correctly, identifying restoration paths for the VM. In some examples, operation 1004 can be implemented in a similar manner as operations 804 and 806 of FIG. 8.

After operation 1004, process flow 1000 moves to operation 1006.

Operation 1006 depicts determining, with a trained prediction model, that a first restoration path of the restoration paths has a predicted recovery time that is below a threshold amount of time based on analyzing the restoration paths. In some examples, operation 1006 can be implemented in a similar manner as operation 808 of FIG. 8.

In some examples, the first restoration path identifies a recovery snapshot that comprises a base snapshot image, and at least one delta image. That is, a snapshot can comprise a base image and one or more deltas.

In some examples, the trained prediction model implements a linear regression. In some examples, the trained prediction model is a tree-based trained prediction model.

In some examples, a restoration target is an on-premises computing system, and the trained prediction model analyzes a snapshot size to be transferred to the on-premises computing system. That is, the size of a snapshot can be considered in examples where a restoration path involves downloading the snapshot to on-premises.

In some examples, a restoration target is an on-premises computing system, and the trained prediction model analyzes a load of a network connection to the on-premises computing system over which a snapshot is to be transferred. That is, an amount of available network bandwidth to on-premises can be considered in examples where the restoration path involves downloading the snapshot to on-premises.

After operation 1006, process flow 1000 moves to operation 1008.

Operation 1008 depicts storing an indication of the first restoration path for the VM. In some examples, operation 1008 can be implemented in a similar manner as operation 810 of FIG. 8.

After operation 1008, process flow 1000 moves to 1010, where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, aspects of computing environment 1100 can be used to implement aspects of client computer 102, server 106, data-driven VM recovery component 108, microservice 1 110a, microservice 2 110b, and microservice 3 110c of FIG. 1, organization database 112, and/or repository 114. In some examples, computing environment 1100 can implement aspects of the process flows of FIGS. 6-10 to facilitate data-driven VM recovery.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples, and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   determining that a virtual machine (VM) has crashed;
   identifying a group of restoration paths for the VM that each identify a respective recovery snapshot, a respective first location of the recovery snapshot, and a respective second location of a respective restoration target;
   predicting that a restoration path of the group of restoration paths has a fastest recovery time based on a result of analyzing the group of restoration paths with a trained prediction model; and
   storing an indication of the restoration path for the VM in a computer memory location.

2. The system of claim 1, wherein the VM is a first VM, wherein the restoration path identifies a first recovery snapshot, a third location of the first recovery snapshot, and a fourth location of the respective restoration target, and wherein the operations further comprise:
   starting a second VM at the fourth location with the first recovery snapshot stored at the third location.

3. The system of claim 2, wherein the starting of the second VM comprises:
   combining a base snapshot image and at least one delta image to produce the first recovery snapshot.

4. The system of claim 2, wherein the starting of the second VM comprises:
   converting a hypervisor from a first type to a second type.

5. The system of claim 1, wherein the trained prediction model was trained based on historical restoration data from a predetermined most-recent amount of time, and wherein the historical restoration data identifies historical recovery paths and corresponding amounts of time for recovery for the historical recovery paths.

6. The system of claim 5, wherein the operations further comprise:
   periodically retraining the trained prediction model with additional historical restoration data that was generated subsequent to the trained prediction model being trained based on the historical restoration data.

7. The system of claim 5, wherein the operations further comprise:
   assigning a higher weight to newer data in the historical restoration data relative to older data in the historical restoration data.

8. A method, comprising:
   determining, by a system comprising a processor, that a virtual machine is not operating correctly;
   identifying, by the system, a plurality of restoration paths for the virtual machine that each identify a respective recovery snapshot, a respective first location of the recovery snapshot, and a respective second location of a restoration target;
   determining, by the system and with a trained prediction model, that a first restoration path of the plurality of restoration paths has at least a threshold fast predicted recovery time based on analyzing the plurality of restoration paths; and
   storing, by the system, an indication of the first restoration path for the virtual machine in a computer memory location.

9. The method of claim 8, further comprising:
   receiving, by the system, user input indicative of the second location of the restoration target; and
   discarding, by the system, restoration paths of the plurality of restoration paths that recover to locations other than the second location.

10. The method of claim 8, wherein the trained prediction model analyzes a snapshot size.

11. The method of claim 8, wherein the trained prediction model analyzes a network connection load.

12. The method of claim 8, wherein the trained prediction model analyzes whether the recovery snapshot comprises a base snapshot image, and at least one delta image.

13. The method of claim 8, wherein the second location of the restoration target is a cloud computing service, and the trained prediction model analyzes a load of the cloud computing service.

14. The method of claim 8, wherein the second location of the restoration target is a cloud computing service, and the trained prediction model analyzes an operating system of the VM.

15. A non-transitory computer-readable medium comprising instructions that, in response to execution, cause a system comprising a processor to perform operations, comprising:
    in response to determining that a virtual machine is not operating correctly, identifying restoration paths for the virtual machine that each identify a respective recovery snapshot, a respective first location of the recovery snapshot, and a respective second location of a restoration target;
    determining, with a trained prediction model, that a first restoration path of the restoration paths has a predicted recovery time that is below a threshold amount of time based on analyzing the restoration paths; and
    storing an indication of the first restoration path for the virtual machine.

16. The non-transitory computer-readable medium of claim 15, wherein a restoration target is an on-premises computing system, and wherein the trained prediction model analyzes a snapshot size to be transferred to the on-premises computing system.

17. The non-transitory computer-readable medium of claim 15, wherein a restoration target is an on-premises computing system, and wherein the trained prediction model analyzes a load of a network connection to the on-premises computing system over which a snapshot is to be transferred.

18. The non-transitory computer-readable medium of claim 15, wherein the first restoration path identifies a recovery snapshot that comprises a base snapshot image, and at least one delta image.

19. The non-transitory computer-readable medium of claim 15, wherein the trained prediction model implements a linear regression.

20. The non-transitory computer-readable medium of claim 15, wherein the trained prediction model is a tree-based trained prediction model.

\* \* \* \* \*